US012710335B2

(12) United States Patent
De Brett et al.

(10) Patent No.: US 12,710,335 B2
(45) Date of Patent: Aug. 18, 2026

(54) METHOD OF ANALYSIS OF AN EXCITATION SYSTEM

(71) Applicant: ROLLS-ROYCE PLC, London (GB)

(72) Inventors: Matthew De Brett, London (GB); Christoph W Schwingshackl, London (GB)

(73) Assignee: ROLLS-ROYCE plc, London (GB)

( * ) Notice: Subject to any disclaimer, the term of this patent is extended or adjusted under 35 U.S.C. 154(b) by 317 days.

(21) Appl. No.: 18/435,173

(22) Filed: Feb. 7, 2024

(65) Prior Publication Data

US 2024/0319040 A1 Sep. 26, 2024

(30) Foreign Application Priority Data

Mar. 1, 2023 (GB) ...................................... 2302990
Mar. 1, 2023 (GB) ...................................... 2302991
Jun. 1, 2023 (GB) ...................................... 2308199

(51) Int. Cl.
*G01M 15/14* (2006.01)
*G01M 7/02* (2006.01)

(52) U.S. Cl.
CPC .................................. *G01M 7/025* (2013.01)

(58) Field of Classification Search
CPC ....... G01M 7/025; G01M 15/14; G01M 7/022
See application file for complete search history.

(56) References Cited

U.S. PATENT DOCUMENTS 765,145 A 7/1904 Manahan
5,206,816 A 4/1993 Hill et al.
10,571,361 B2 * 2/2020 Gysling .............. G01M 13/028
2005/0278127 A1 * 12/2005 Griffin .................. G01H 1/006
702/56
2012/0073118 A1 3/2012 Bywaters
(Continued)

FOREIGN PATENT DOCUMENTS

CN 110672292 B 1/2021
EP 2 921 829 A1 9/2015
(Continued)

OTHER PUBLICATIONS

Jul. 10, 2024 Search Report issued in European Patent Application No. 24155167.0.

(Continued)

*Primary Examiner* — Toan N Pham
(74) *Attorney, Agent, or Firm* — Oliff PLC

(57) ABSTRACT

A method of analysing a non-contact excitation system for a spin rig includes, calculating a magnetic field per test piece element, integrating the magnetic field over the test piece element surface to get a force per test piece element, performing a Fourier analysis of the forces acting on the test piece element as it moves past the periodic array of exciter elements, calculating the damping added to the test piece element due to magnetic induction, calculating a vibration response of the test piece element as it moves past the stationary array of exciter elements, calculating a transient response of the test piece element where the stationary array of exciter elements is rapidly moved away from the test piece elements, and using the calculated transient response of the test piece element to calculate a required electromagnetic holding force for the array of exciter elements.

8 Claims, 9 Drawing Sheets

(56) References Cited

U.S. PATENT DOCUMENTS

| | | | |
|---|---|---|---|
| 2012/0102701 | A1 | 5/2012 | Borufka et al. |
| 2019/0120717 | A1 | 4/2019 | Gysling et al. |
| 2020/0072062 | A1 | 3/2020 | MacMahon et al. |

FOREIGN PATENT DOCUMENTS

| | | | |
|---|---|---|---|
| JP | S62-150133 | A | 7/1987 |
| JP | 2015-151895 | A | 8/2015 |
| JP | 2020-143977 | A | 9/2020 |

OTHER PUBLICATIONS

Jul. 12, 2024 Search Report issued in European Patent Application No. 24155166.2.
Jun. 27, 2024 Search Report issued in European Patent Application No. 24155168.8.
Aug. 17, 2023 Search Report issued in British Patent Application No. 2302991.1.
Aug. 17, 2023 Search Report issued in British Patent Application No. 2302990.3.
Nov. 29, 2023 Search Report issued in British Patent Application No. 2308199.5.
U.S. Appl. No. 18/435,205, filed Feb. 7, 2024 in the name of Matthew De Brett et al.
U.S. Appl. No. 18/435,127, filed Feb. 7, 2024 in the name of Matthew De Brett et al.
Jun. 16, 2026 Notice of Allowance issued in U.S. Appl. No. 18/435,205.

* cited by examiner

METHOD OF ANALYSIS OF AN EXCITATION SYSTEM

This disclosure claims the benefit of UK Patent Application No. GB 2308199.5, filed on 1 Jun. 2023, which is hereby incorporated herein in its entirety.

TECHNICAL FIELD

The present disclosure relates to a method of analysing a magnetic non-contact engine order excitation system for a spin rig.

BACKGROUND

Existing engine order excitation systems for testing and characterising engine components may be used to study dynamic effects such as mistuning or flutter. Engine order excitation systems in spin rigs may use a contact-based method of excitation, such as oil jets.

It may be desirable to provide an improved non-contact engine order excitation system for a spin rig together with a method of analysing the excitation system.

SUMMARY

According to a first aspect of the present disclosure, there is provided a method of analysing a non-contact excitation system for a spin rig, the spin rig comprising a plurality of test piece elements for attachment to a test piece for rotation about an axis of rotation (X) of the spin rig, and a plurality of exciter elements arranged around the axis of rotation; the method comprising the steps of:

(i) providing the test piece elements and the exciter elements formed from magnetically attractive material;
(ii) providing either or both of the test piece elements and the exciter elements as comprising magnets;
(iii) arranging each exciter element as being moveable between an active position, in which a magnetic force is provided between each exciter element and at least one of the test piece elements, and an inactive position, in which the magnetic force between the exciter elements and the at least one test piece element is reduced;
(iv) calculating a magnetic field per test piece element;
(v) integrating the magnetic field over the test piece element surface to get a force per test piece element;
(vi) repeating step (iv) for different test piece element positions;
(vii) performing a Fourier analysis of the forces acting on the test piece element as it moves past the periodic array of exciter elements;
(viii) calculating the damping added to the test piece element due to magnetic induction;
(ix) calculating a vibration response of the test piece element as it moves past the stationary array of exciter elements;
(x) calculating a transient response of the test piece element where the stationary array of exciter elements is rapidly moved away from the test piece elements; and
(xi) using the calculated transient response of the test piece element to calculate a required electromagnetic holding force for the array of exciter elements.

The foundation of this invention is an open-source Python® toolbox called magpylib. Unlike the computationally expensive finite element approaches used more commonly, magpylib uses analytical solutions and approximations to the 3D magnetic fields of permanent magnets with simple geometries (e.g., cuboids, cylinders). Specifically, magpylib is used to compute the magnetic B-field (in mT) resulting from various arrangements of permanent magnets. The magnets are defined by their size, shape, position and remanent magnetisation.

Advantages of the disclosed method of analysis are the simplifications they make to turn highly complex multi-physics problems into computationally inexpensive simulations, while still producing valuable information. This then makes the method of analysis of the disclosure suitable as a design tool, since simulations can be quickly repeated to investigate different parameter spaces and, hence, to optimise the design.

The actual computational simplifications are discussed below and can be summarised as: using analytical magnetic field expressions (implemented by magpylib open-source code); the periodic assumption in the Fourier analysis; the semi-analytical approach derived for the eddy current analysis, using continuous (analytical) beam vibration modes; coupling of a linear, single degree-of-freedom oscillator with a nonlinear input force in the blade dynamic simulations.

Optionally, method step (iv) comprises the steps of:

(iv-a) for each magnet define a set of dimensions;
(iv-b) for each magnet define a grid of points, each point having co-ordinates; and
(iv-c) calculating a magnetic field at each of the grid points.

This method step allows the calculation of the resultant magnetic force acting on a permanent magnet in the presence of other permanent magnets. A set of discrete points is defined on the surface of the magnet and magpylib is used to calculate the magnetic field at these points.

Optionally, method step (v) comprises the steps of:

(v-a) defining a mesh on a surface of the magnet;
(v-b) calculating a magnetic field at points specified in the mesh; and
(v-c) calculating a force acting on the magnet by forming the Maxwell stress tensor and integrating over the mesh.

A numerical integration routine is then added on to calculate the resultant force.

Optionally, method step (vi) comprises the steps of:

(vi-a) defining a mesh on a surface of the magnet;
(vi-b) defining a trajectory for the magnets;
(vi-c) loop over the number of steps defined by the displacement trajectory;
(vi-d) calculating a magnetic field for the new collection of magnets;
(vi-e) defining a trajectory for the magnets; and
(vi-f) calculating a force acting on the magnet at each step along the displacement axis.

This process is looped over for different magnet positions, to calculate the force as one moving magnet translates/rotates past a set of stationary magnets.

Optionally, method step (vi) comprises the steps of:

(vii-a) calculating a force generated as each exciter magnet translates past a blade tip magnet;
(vii-b) loop over the engine orders;
(vii-c) calculating, for each engine order, a tangential distance between adjacent exciter magnets;
(vii-d) calculating a force profile periodic force using the forces generated by the magnets; and
(vii-e) calculating a Fast Fourier Transform of the periodic force profile.

This method step performs a Fourier analysis of the forces acting on a permanent magnet as it translates/rotates past a periodic array of stationary magnets. The intention of this analysis is to investigate the relationship effect of different magnet dimensions and the spatial frequency of the periodic array on the resultant force. Rather than defining a new periodic array for each spatial frequency, the force is calculated as is moved past a single stationary magnet; the resulting force profile is then repeated (and superimposed if necessary) with different displacement offsets to generate a periodic force signal suitable for Fourier analysis. Along with the use of analytical magnetic fields, this simplifying step makes the calculation of design charts such as the one below computationally cheap.

Optionally, method step (vi) comprises the steps of:

(viii-a) defining properties of a continuous beam to approximate an engine blade;

(viii-b) defining a grid of coordinate points that cover the continuous beam; and (viii-c) integrating over the beam volume to estimate the damping resulting from eddy currents induced by the magnet.

This method step estimates the damping added to the blade due to magnetic induction. As a conductor moves through a magnetic field, currents are induced that cause heating and damp vibration; the added damping could be problematic since one of the purposes of a spin rig could be to measure mechanical damping added by different friction damper designs. A semi-analytical approach has been developed for this purpose, in which an expression for the added damping ratio was derived in terms of a double integral over the vibration mode shape and magnetic field. A numerical integration scheme solves this for the case of an analytical beam (with various boundary conditions) and field that is assumed to vary in two dimensions.

Optionally, method step (vi) comprises the steps of:

(ix-a) calculating tangential and axial force profiles for the blade;

(ix-b) create a transfer function representative of a single degree of freedom oscillator;

(ix-c) defining a velocity, a time axis, and a displacement axis for the blade; and (ix-d) performing a transfer function integration to obtain blade displacement.

This step allows the coupling of the magnetic force model with a dynamic model of a blade's vibration. The former considers a steady-state case and aims to calculate the periodic force exerted on the blade (with magnet attached to the tip) and subsequent vibration response as it rotates past a stationary array of permanent magnets.

Optionally, method step (vi) comprises the steps of:

(x-a) generating a force profile to simulate a response of the blade;

(x-a) repeating the force profile generation after a time delay; and (x-a) calculating a free decay for the blade.

To simplify the problem, the blade dynamics are modelled as a single degree-of-freedom oscillator with realistic parameters. The steady-state vibration of the oscillator is simulated with a (Matlab®) differential equation solver, in response to a nonlinear magnetic force that is implemented with a look-up table. This simplified approach enables a solution to be reached in seconds, which is orders of magnitude faster than a full finite element multi-physics simulation using a full model of a blisk and magnet array.

According to a further aspect of the present disclosure, there is provided a method of analysing a non-contact excitation system for a spin rig: the spin rig comprising a plurality of test piece elements for attachment to a test piece for rotation about an axis of rotation of the spin rig; and a plurality of exciter elements arranged around the axis of rotation, wherein the test piece elements and the exciter elements are magnetically attractive; wherein the test piece elements and/or the exciter elements comprise magnets; each exciter element being moveable between an active position, in which a magnetic force is provided between each exciter element and at least one of the test piece elements, and an inactive position, in which the magnetic force between the exciter elements and the at least one test piece element is reduced.

The system may be mounted in a spin rig. The system may be mounted on an inside face of a casing of a spin rig. The system may be mounted on an end wall of a casing of a spin rig. The system may enable production of an engine order excitation of the test piece rotating in a spin rig. The system may enable the excitation force acting on the test piece elements to be reduced quickly. This may enable measurement of a free vibration decay. Measurement of a free vibration decay may be used to characterise damping devices acting on the test piece. The non-contact system may provide greater flexibility and precision over contact systems.

The spin rig may define an axis system, comprising an axial direction (which is aligned with the rotational axis), a radial direction, and a circumferential direction. The axial, radial and circumferential directions are mutually perpendicular.

The test piece elements and the exciter elements are magnetically attractive. Magnetically attractive may mean that the elements may be attracted to a magnet. The test piece elements and the exciter elements may both be magnets, i.e. they may produce magnetic fields. Only one of the test piece elements and the exciter elements may be magnets, i.e., produce magnetic fields. If only one of the test piece elements and the exciter elements are magnets, the other of the exciter elements and the test piece elements may be ferromagnetic elements. Ferromagnetic elements themselves may not produce a magnetic field, but may be attracted to a magnet, such as a permanent magnet or an electromagnet. A magnetically attractive element may be a ferromagnetic elements or a magnet.

The exciter elements may be magnets and the test piece elements may be ferromagnetic elements.

The excitation system may be a magnetic excitation system. The plurality of exciter elements may be a plurality of exciter magnets. The plurality of exciter elements may be an array of exciter elements. The exciter elements may be arranged axi-symmetrically about the axis of rotation. The exciter elements may be a circular array of elements. The exciter elements may be permanent magnets. The exciter elements may be electromagnets. The number of exciter elements of the system may be adjustable. The system may be modular.

The test piece elements may be magnets. The test piece elements may be permanent magnets. The test piece elements may be electromagnets. The test piece may be driven to rotate around the axis of rotation by a motor. In use, the elements may be attached to the test piece. The test piece may be mounted on a shaft which is configured to rotate around the axis of rotation. The test piece may be a bladed disc, a bladed ring, a blisk or a bling comprising a plurality of blades. The test piece elements may be attached to a plurality of blades. The test piece elements may each be attached to a tip (i.e., a radially outermost region) of a blade.

In the active position, the exciter elements may be proximate to the test piece elements. In the inactive position, the exciter elements may be away from the test piece elements. The magnetic force may be reduced to a negligible force in the inactive position. The exciter elements may be configured to remain at a fixed radial position during testing. The exciter elements may not rotate around the axis of rotation during testing.

Each exciter element may be moveable in an axial direction of the system between the active position and the inactive position.

Each exciter element may be mounted on an exciter element carriage. Each exciter element carriage may carry a plurality of exciter elements. There may be a plurality of exciter element carriages. Each exciter element carriage may be mounted on a rail system. The rail system may be mountable on a casing of a test chamber for a spin rig. The number of exciter elements may be adjustable.

The number of exciter element carriages in the system may be adjustable depending upon the size of the spin rig and test piece to be used.

Each exciter element may be resiliently biased to the inactive position. A spring may provide the resilient biasing. Spring tension and design may be selected to control the speed of movement of the carriage from the active position to the inactive position.

The system may comprise a shock absorber corresponding to at least one exciter element. The shock absorber may dampen the movement of the exciter element from the active to the inactive position. The system may comprise a linear bushing and shock absorber which cooperate to dampen the movement of the exciter element from the active to the inactive position. The shock absorber may inhibit the exciter element (or the exciter element carriage) from coming into contact with a front cover of the spin rig during movement from the active position to the inactive position.

The system may comprise a plurality of electromagnets, each corresponding to at least one exciter element, and each electromagnet may be configured to hold the or each corresponding exciter element in the active position during use. During use may mean during an initial rotation of the test piece about the axis of rotation. The electromagnet may be configured to hold the or each corresponding exciter element in the active position by magnetic engagement with the exciter element carriage. Upon release of the electromagnet, the or each corresponding exciter element may be moved away from the test piece elements. This movement may be rapid such that the excitation force rapidly reduces. The electromagnets may be controlled via a dedicated circuit.

Each exciter element carriage may comprise at least one electromagnet. Each electromagnet may be an energise-to-release electromagnet. Each electromagnet may be powered during use and switched off to release. Release of the electromagnet may cause a spring to move the or each exciter element from the active position to the inactive position. The exciter element may be manually moved from the inactive position into the active position after release of the electromagnet, until the exciter element carriage engages with the electromagnet.

In use, the exciter elements may be arranged around the test piece. Each exciter element may be axially and radially offset from the plurality of test piece elements.

The system may further comprise a test piece to which the test piece elements are attached. The test piece may be a bladed disc and the test piece elements may be attached to tips of the blades. The test piece may be a blisk, a bladed ring or a bling, and the test piece elements may be attached to tips of the blades. The system may further comprise one or more strain gauges attached to the test piece for measurement of the strain on the specimen. A slip ring or telemetry unit may transmit the strain gauge measurements to a recording device. The strain may be measured over time and recorded. Analysis of strain vs time may enable analysis of the vibration free decay and characterisation of any damping devices acting on the test piece.

A fan, such as a fan for a gas turbine engine may be an example of a bladed disc or a blisk. A bladed disc or a blisk may comprise a central portion, from which the blades may extend, for example in a radial direction. The blades may be formed integrally with the central portion. Such an arrangement may be referred to as a blisk. Any suitable method may be used to manufacture such a bladed disc or blisk. For example, for a bladed disc, at least a part of the blades may be machined from a block and/or at least part of the blades may be attached to the hub/disc by welding, such as linear friction welding. The bladed disc or blisk as described herein may have any desired number of blades, for example 14, 15, 16, 17, 18, 19, 20, 21, 22, 23, 24, 25 or 26 blades. According to a second aspect, there is a provided a method of testing a test piece using the non-contact excitation system for a spin rig according to any of the statements relating to the first aspect, the method comprising: attaching the plurality of test piece elements to the test piece; rotating the test piece about the axis of rotation; and reducing the magnetic force between the exciter elements and the test piece elements by moving the exciter elements from the active position to the inactive position.

According to a further aspect of the present disclosure, there is provided a non-contact excitation system for a spin rig comprising: a plurality of test piece elements for attachment to a test piece for rotation about an axis of rotation of the spin rig; and a plurality of exciter elements arranged around the axis of rotation, wherein the test piece elements and the exciter elements are magnetically attractive; wherein the test piece elements and/or the exciter elements comprise magnets; and wherein, in use, the exciter elements are arranged around the test piece; wherein each exciter element is axially and radially offset from the plurality of test piece elements.

The exciter elements may be arranged in an axi-symmetric array. The exciter elements may be spaced equidistantly apart from neighbouring elements in the array. The exciter elements may be arranged circumferentially around the test piece. The exciter elements may be spaced at varying distances apart from neighbouring elements in the array (i.e., not equidistantly). A non-equidistant arrangement may allow the generation of multiple excitation frequencies. The number of exciter elements around the circumference and their spatial distribution determines the fundamental frequency and characteristics of excitation force applied to the test piece.

The location of the exciter elements relative to the test piece elements may influence the characteristics of the magnetic force exerted on the test piece. The system may minimise the risk of a collision between the test piece and exciter elements. The system may optimise the profile of the force exerted on the test piece. The system may offer a smoother, more controllable force profile since the main force component exerted on the blade is a shear force in the axial axis.

The exciter elements may be magnets which may each have a magnetic pole which may be oriented radially. The magnetic poles may be oriented circumferentially or axially. The plurality of exciter elements may be magnets which may alternate in polarity in a circumferential direction around the axis of rotation. The magnets may be oriented such that neighbouring magnets have similar poles, alternating poles, or a mixture of both depending upon the desired excitation. The magnets may vary in strength, for example to generate a sinusoidal forcing field. The exciter magnets may be permanent magnets. The exciter magnets may be bar magnets.

The test piece may be a bladed disc or a blisk and the test piece elements may be for attachment to a plurality of blade tips. The test piece elements may be for attachment to a radially outermost position of a blade tip.

The test piece elements may be magnets and may each have a magnetic pole oriented radially. The magnetic poles may be oriented circumferentially or axially. The plurality of test piece elements may be magnets which alternate in polarity in a circumferential direction around the axis of rotation. The magnets may be oriented such that neighbouring elements have similar poles, alternating poles, or a mixture of both depending upon the desired excitation. The magnets may vary in strength, for example to generate a sinusoidal forcing field.

The system may comprise an adapter piece for adjustment of the system to accommodate a range of sizes of test piece and/or for testing at a range of engine orders. An adapter piece may be provided to alter a radial distance between an exciter element and a test piece element in the active position.

Each exciter element may be moveable between an active position, in which a magnetic force is provided between each exciter element and at least one of the test piece elements, and an inactive position, in which the magnetic force between the exciter elements and the at least one test piece element is reduced.

The system may further comprise a test piece to which the test piece elements are attached. According to a fourth aspect, there is provided a method of testing a test piece using the non-contact excitation system for a spin rig of any of the statements relating to the third aspect, comprising: attaching the plurality of test piece elements to the test piece; and rotating the test piece about the axis of rotation.

The skilled person will appreciate that except where mutually exclusive, a feature or parameter described in relation to any one of the above aspects may be applied to any other aspect. Furthermore, except where mutually exclusive, any feature or parameter described herein may be applied to any aspect and/or combined with any other feature or parameter described herein.

DESCRIPTION OF THE FIGURES

Embodiments will now be described by way of example only, with reference to the figures, in which.

DETAILED DESCRIPTION

Figure 1:
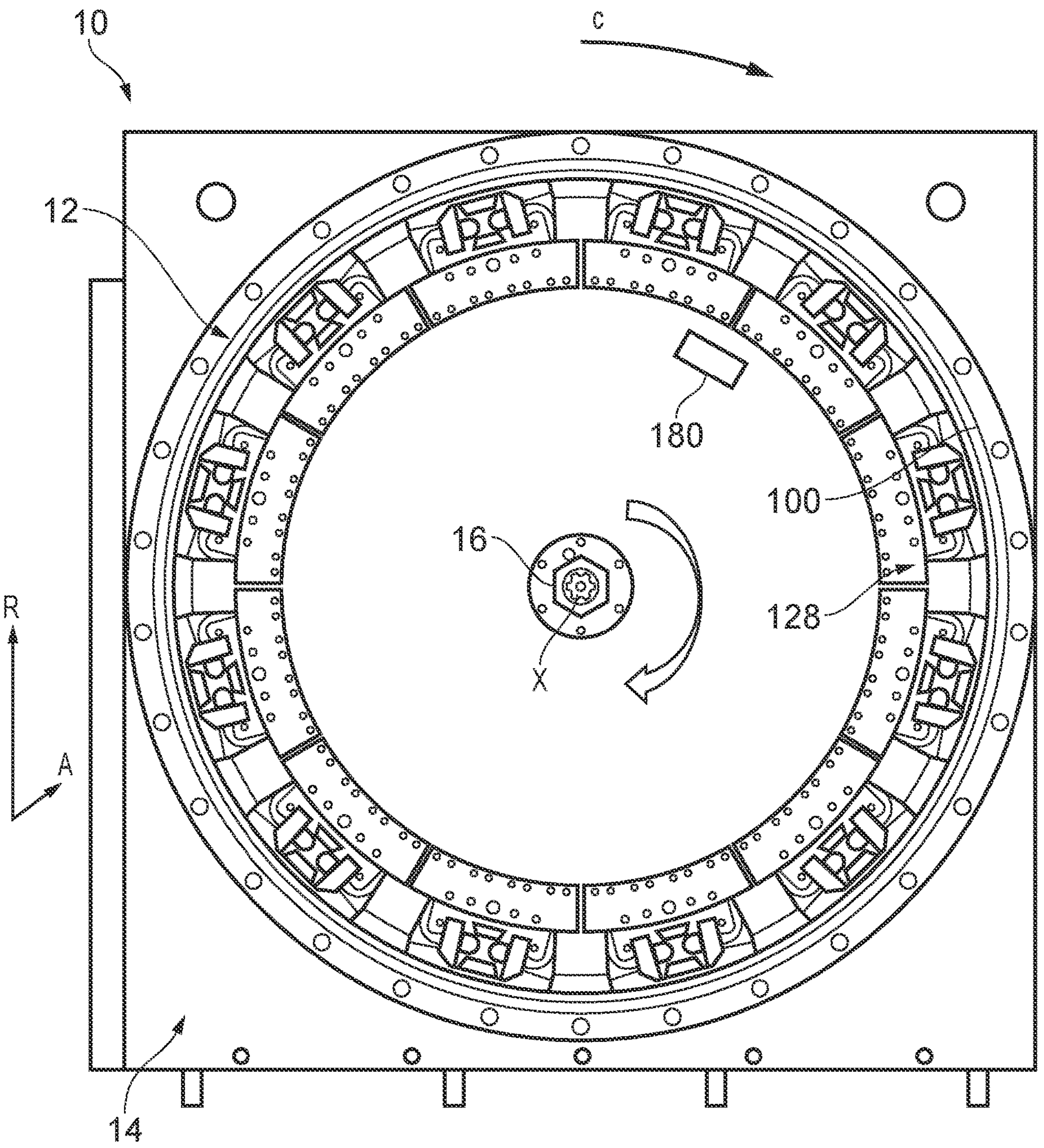
FIG. 1 is an axial view of a spin rig and a system.

FIG. 1 shows a spin rig 10, comprising a non-contact excitation system 100. The spin rig 10 comprises a shaft 16 to which a test piece 200 may be mounted (not shown in FIG. 1). The shaft 16 defines an axis of rotation X. The spin rig 10 is enclosed by a casing, which includes a front flange 12 and a backplate 14.

For testing, a test piece 200 is mounted to the shaft 16 and a motor (not shown) is used to drive the test piece 200 to rotate around the axis of rotation X. The test piece in this example is a blisk, with blades extending outwardly (radially) from the centre). The excitation system comprises magnetically attractive test piece elements 180, in this example test piece magnets, for attachment to the test piece. As will be described in more detail, the test piece magnets are attached to the test piece at a tip (or radially outermost region) of the test piece 200, for instance at one or more blade tips. The magnetic poles ($P_T$) of the test piece magnets are oriented radially (see FIG. 5). In this example, all of the test piece magnets have the same pole pointing in the same direction. In other examples, each individual test piece magnet pole may be arranged in any orientation, such as in alternating directions relative to neighbouring test piece magnet poles, or in any other arrangement, to provide a desired excitation.

The geometry of the spin rig 10, and components thereof, is defined by a conventional axis system, comprising an axial direction A (which is aligned with the rotational axis X and is directed into the page in the FIG. 1 view), a radial direction (in the bottom-to-top direction in FIG. 1), and a circumferential direction C around the rotational axis X of FIG. 1. The axial, radial and circumferential directions are mutually perpendicular.

The non-contact excitation system 100 is a magnetic engine order excitation system. Referring to FIGS. 1 to 5, the excitation system 100 comprises a plurality of magnetically attractive exciter elements 122, in this example exciter magnets, arranged around the axis of rotation X.

It will be appreciated that, in this example, both the exciter elements 122 and test piece elements 180 are magnets. However, in other examples, only one of the plurality of exciter elements 122 and the plurality of test piece elements 180 may be magnets. In such an example, the other plurality of elements 122, 180 are not magnets but are ferromagnetic elements which are attracted to a magnet. As long as at least one of the plurality of test piece elements and the plurality of exciter elements are magnets, a magnetic field will be produced and a magnetically attractive element in proximity to the magnet will experience a magnetic force.

The excitation magnets 122 are arranged in a circular array around the circumference of the test piece 200. The excitation magnets 122 in this example are permanent bar magnets. The system 100 may provide flexibility, precision and a reduction in contaminants compared with previous excitation systems.

The exciter magnets 122 are each mounted on a carriage 128, which is mounted to the front flange 12 via a mounting system. In this example, each carriage 128 has three exciter magnets, but in other examples a different number of exciter magnets 122 may be provided. As shown in FIG. 1, in this example, there are 12 carriages 128 arranged around the circumference of the test piece 200 forming a circular array, however in other examples, a different number may be provided. The number of carriages 128 may be dependent upon the geometry of the spin rig 10 and the test piece 200 and the desired excitations for testing. The number of exciter magnets around the circumference and their spatial distribution may determine the fundamental frequency and characteristics of excitation force applied to the test piece 200.

The carriage 128 is mounted on a rail 138, along which it is movable. In use, the rail 130 is arranged axially, such that movement of the carriage 128 along the rail 130 is axial movement.

Figure 2:
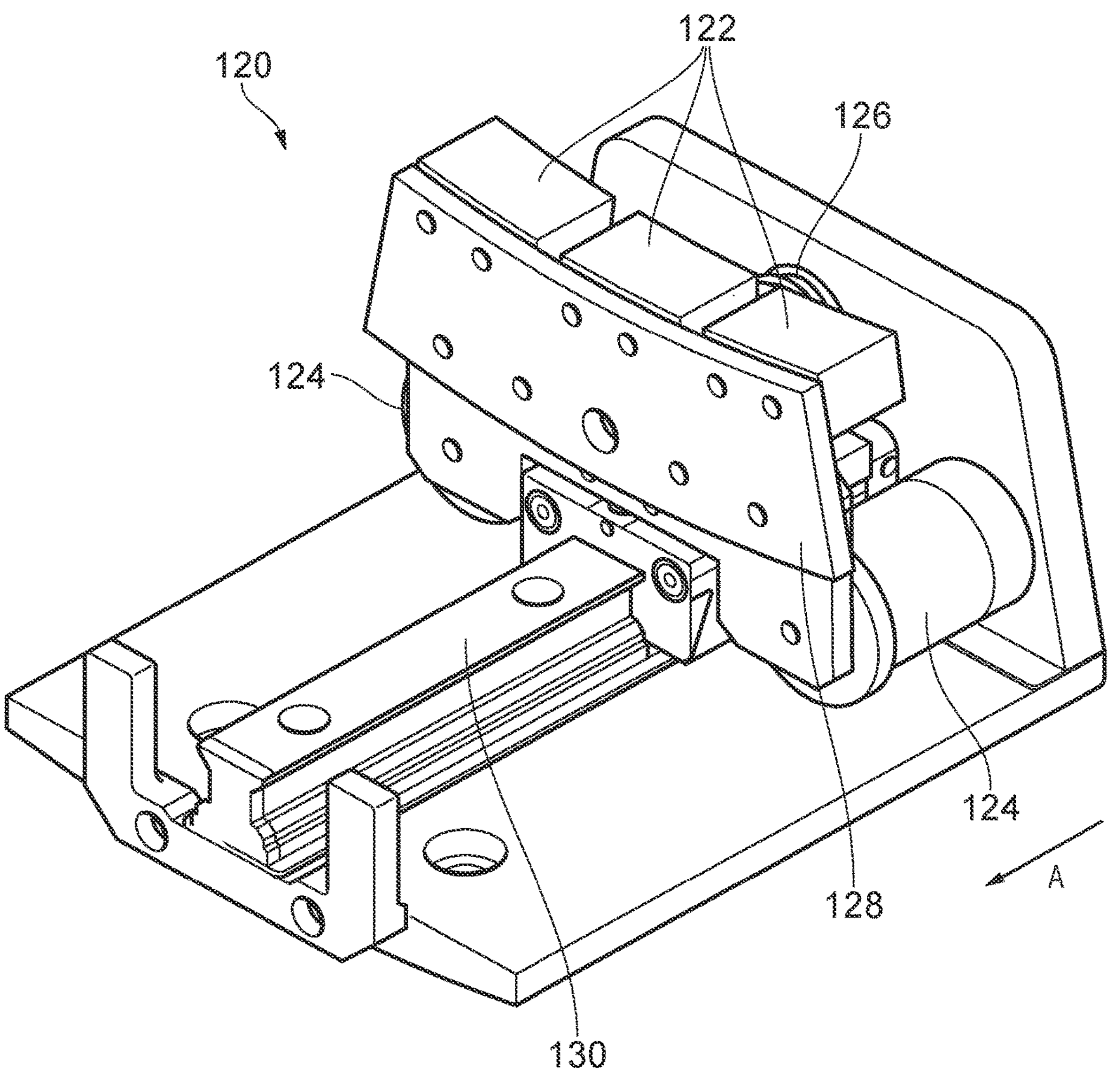
FIG. 2 is a perspective view of an exciter element carriage and rail.
Figure 5A:
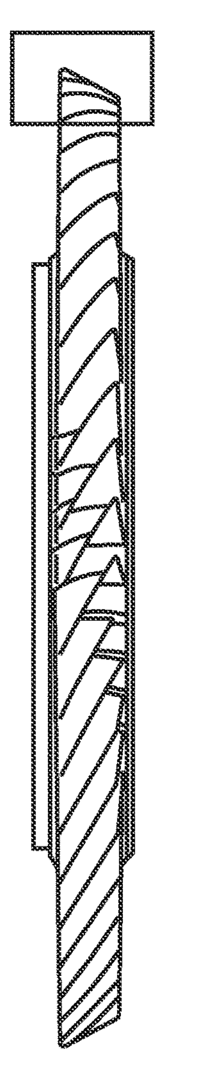
FIGS. 5*a* and 5*b* show the relative position of an exciter element and a test piece element in an active and inactive position, respectively.
Figure 5A:
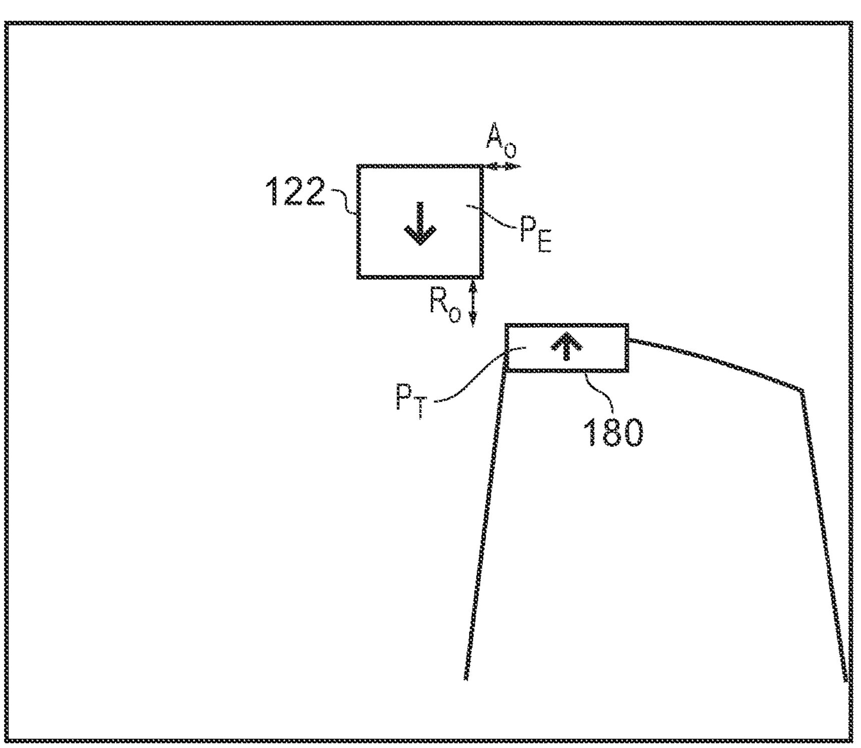
Figure 5B:
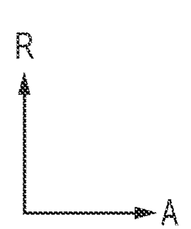
Figure 5B:
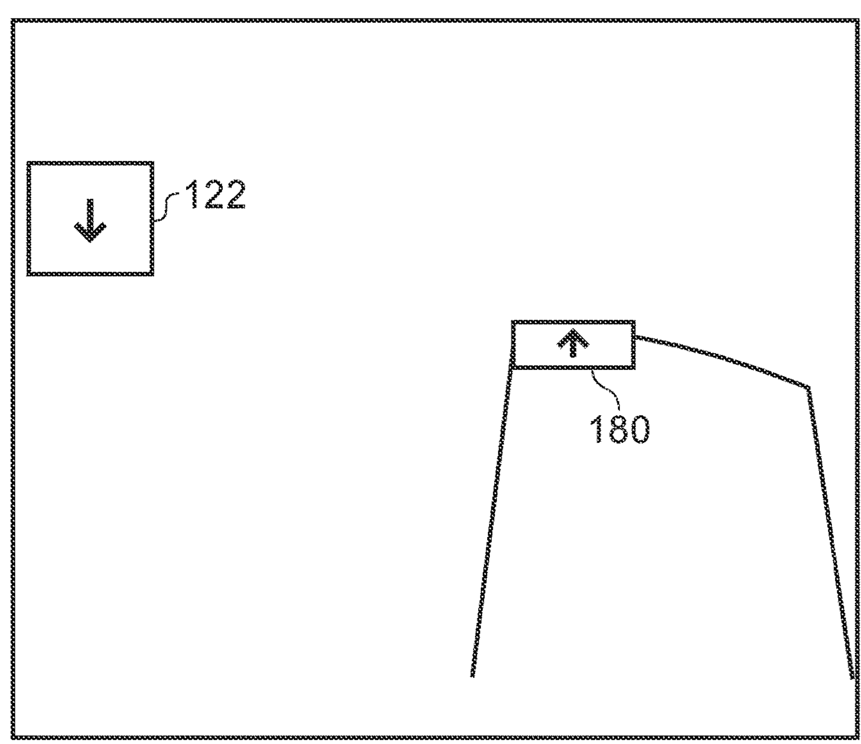

A first position of the carriage 128 on the rail 130, shown in FIGS. 2, 3 and 5*a*, is an active position. In this position, the exciter magnets 122 are at their closest position to the test piece magnets 180 and the test piece 200. In the active position, a magnetic force is provided between each exciter magnet and at least one of the test piece magnets 180. In the active position, the carriage 128 is at its furthest position from the front flange 12 of the casing. By positioning the exciter magnets 122 close to the test piece 200, the force amplitude is amplified.

In use, the exciter magnets 122 are arranged around the test piece 200 and the test piece magnets 180. In the active position, each exciter magnet 122 is axially and radially offset from the plurality of test piece magnets 180, as shown in FIG. 5*a* which is a schematic representation showing the relative position of the magnets 122, 180 (but does not show the carriage, rail, electromagnets, etc). The location of the exciter magnets 122 relative to the test piece magnets 180 influences the characteristics of the force exerted on the test piece 200. The relative location used in this system may minimise the risk of a collision between the test piece 180 and exciter magnets 122 when the test piece 200 is vibrating with an axial or radial component. This risk is significant in mistuned blisks, where blade vibration amplitudes have higher variance. The relative location used in this system may optimise the profile of the force exerted on the test piece. The main force component exerted on the test piece 200 is a shear force in the axial axis, which offers a smoother, more controllable force profile.

By providing an axial offset between the plurality of exciter magnets 122 and the plurality of test piece magnets 180, the exciter magnets 122 may be out of alignment in an axial direction by a distance $A_o$ . . . . By providing a radial offset between the plurality of exciter magnets 122 and the plurality of test piece magnets 180, the exciter magnets 122 may be out of alignment in a radial direction by a distance $R_o$ . . . . The axial and radial offset distances $A_o$, $R_o$ may be measured from a respective edge of each magnet 122, 180.

The exciter magnets 122 each have a magnetic pole ($P_E$) which is aligned radially. The plurality of exciter magnets (122) alternate in polarity in a circumferential direction around the axis of rotation X. For instance, an exciter magnet 122 having a south pole aligned pointing towards the rotational axis X will be between two exciter magnets having a north pole aligned pointing towards the rotational axis X. In other examples, different orientation patterns of neighbouring magnetic poles may be desired. The magnets may vary in strength, for example to generate a sinusoidal forcing field.

Figure 6A:
FIGS. 6*a* and 6*b* show force-displacement graphs for tangential and axial forces, respectively.
Figure 6A:
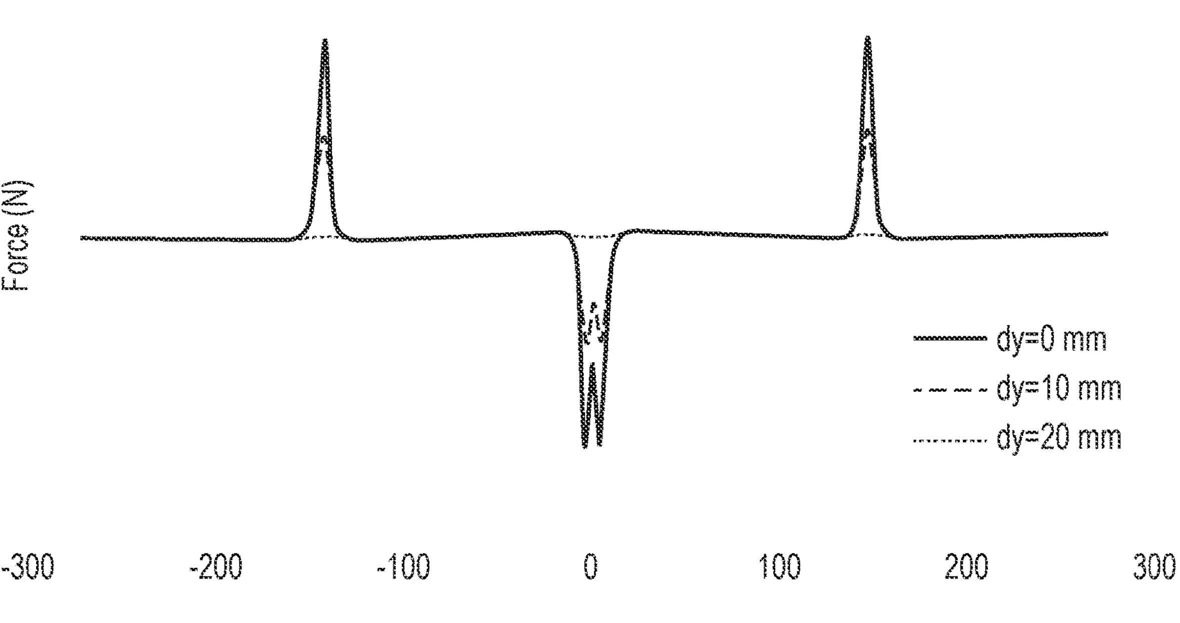
Figure 6B:
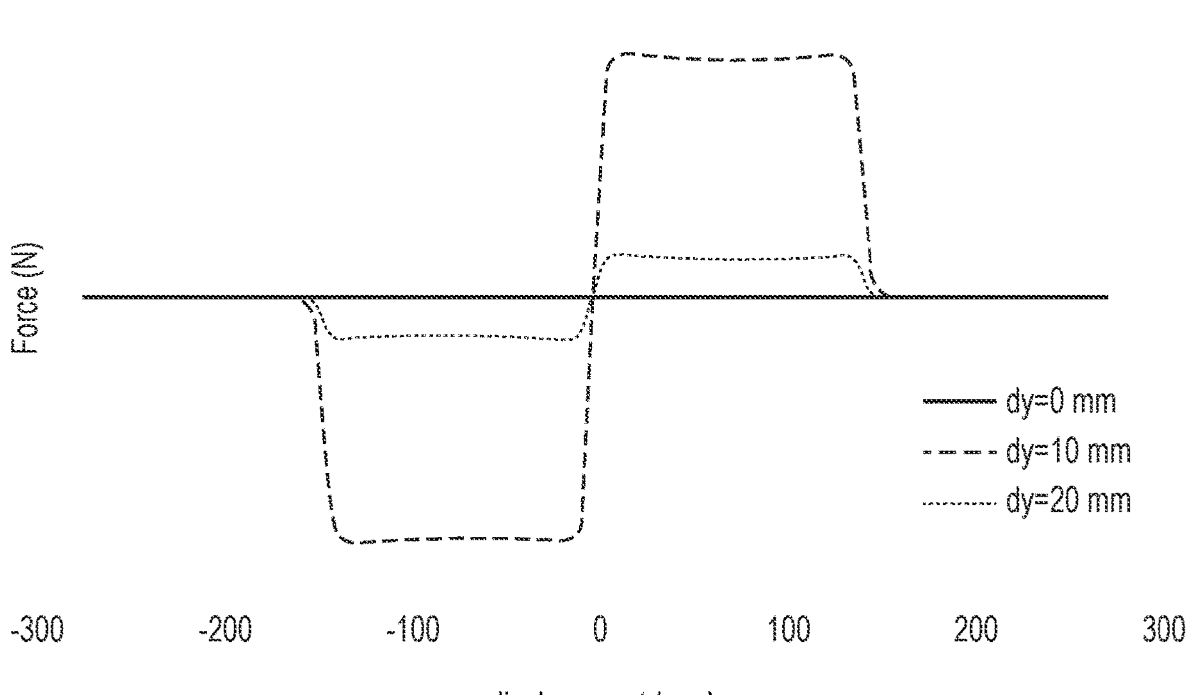

FIGS. 6*a* and 6*b* show simulations of the tangential and axial forces exerted on a test piece 200 (a blisk) as it passes below two exciter magnets 122 with opposite polarities and radially aligned poles. The different lines represent positions with constant radial offset and different axial offsets. The solid line represents a configuration of radial offset with no axial offset (dy=0). In this arrangement, the main force component exerted on the test piece 200 is a shear force in the tangential axis (FIG. 6*a*). Although the shear force can have a relatively large amplitude it tends to have a sharp character that could introduce unwanted higher harmonics into the vibration response of the test piece 200.

In the radial and axial offset configuration, the main force component is shown by the dashed (dy=10 mm) and dotted (dy=20 mm) lines. The axial force (FIG. 6*b*), when axial offset is present, more closely resembles a square wave. The square shape gives it a large amplitude at the fundamental frequency. When the vibration of the test piece 200 is taken into account the square shape becomes more sinusoidal, which lessens the influence of higher harmonics. Therefore, the main force component exerted on the test piece when both axial and radial offset are present, is a shear force in the axial axis, which offers a smoother, more controllable force profile.

Referring back to FIGS. 3*a*, 3*b*, 4 and 5*b*, as described above, the carriage 128 and the exciter magnets 122 are movable along a rail 130 in the axial direction, from the active position of FIGS. 3*a* and 3*b*, to the inactive position shown in FIGS. 4 and 5*b*. The carriage 128 is moved axially from the test piece 200 in the direction of the front flange 12. In this position, the magnetic force between the exciter magnets 122 and the test piece magnet 180 is reduced. If the exciter magnets 122 are moved far enough away, the excitation force acting on the test piece 200 rapidly reduces to zero.

The movement of the carriage 128 and the exciter magnets 122 is controlled by a pair of electromagnets 124. In this example, the carriage has two electromagnets 124, but in other examples there may be only one or more than two electromagnets 124 present in each carriage 128. The electromagnets 128 are energised to release electromagnets 128 and are configured to hold the or each corresponding exciter magnet 122 (and carriage 128) in the active position during use. A spring 126 is also provided, which is attached to the carriage 128 and resiliently biases the carriage 128 to the inactive position. The spring 126 is compressed in the active position and is configured to push the carriage 128 away along the rail 130 to the inactive position when the electromagnet 124 is released. The spring length, spring constant and electromagnet strength may be adjusted according to the properties of the exciter and test piece magnets 122, 180 and the desired speed of movement from the active to the inactive position.

Figures 3A, 3B:
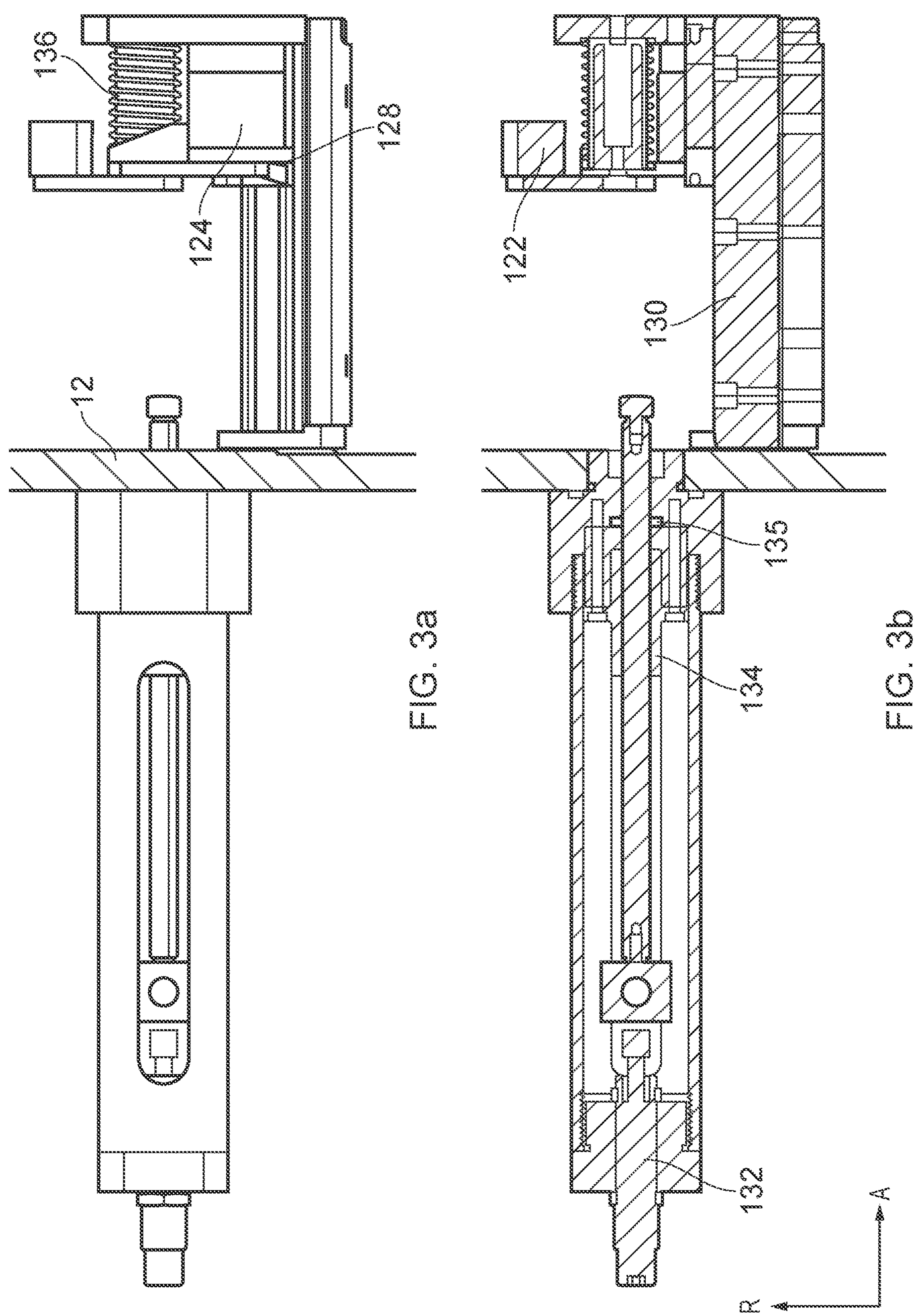
FIGS. 3*a* and 3*b* are side and sectional views, respectively, of an exciter element carriage, rail and damping system according to the disclosure in an active position.
Figure 4:
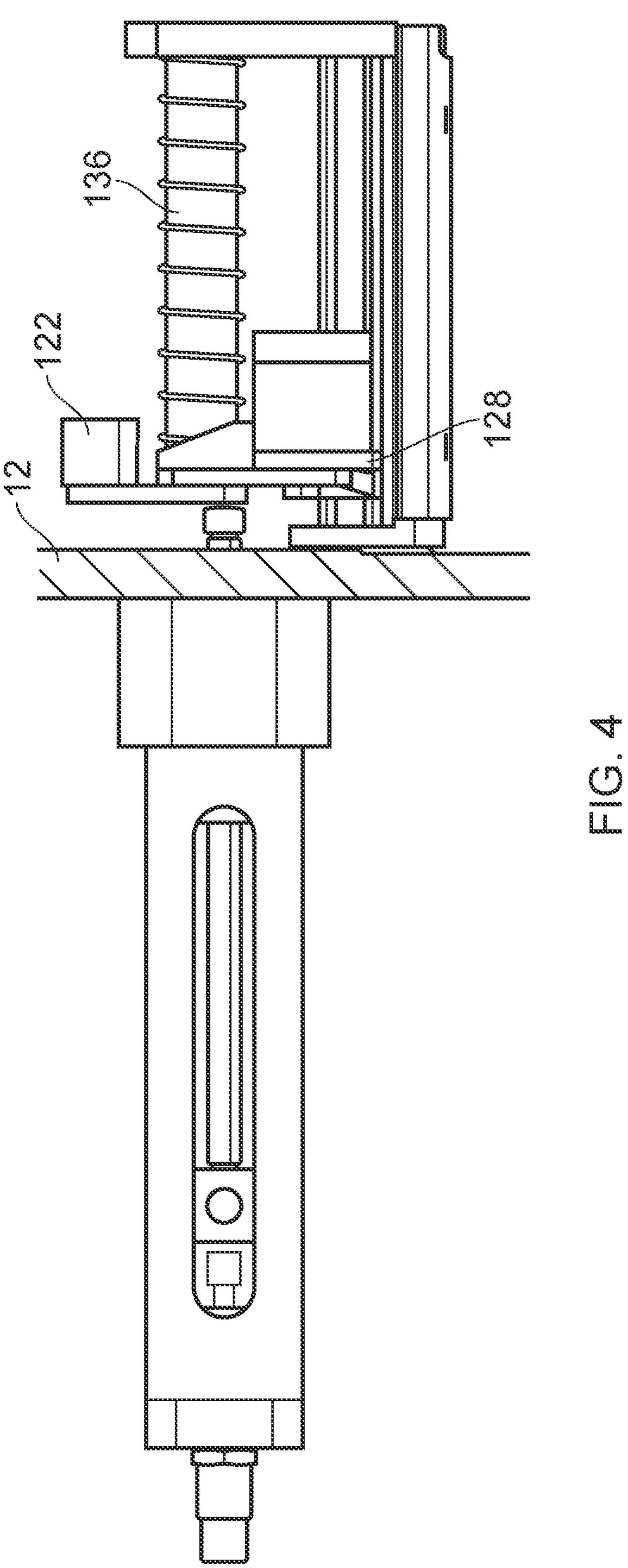
FIG. 4 is a side view, of an exciter element carriage, rail and damping system in an inactive position.

A reset and braking sub-system for the excitation system 100 is shown in FIGS. 3*a*, 3*b* and 4. The reset and braking sub-system comprises a shock absorber (132) corresponding to at least one exciter magnet 122, in this example three exciter magnets 122 on the carriage, the shock absorber 132 to dampen the movement of the exciter magnet(s) 122 and the carriage 128 from the active to the inactive position. The shock absorber 132 is connected to the exciter magnet(s) 122 and the carriage via a linear bushing 134 and a linear seal 136. The linear bushing 134 and shock absorber 132 may safely stop the carriage without it impacting the front flange 12. By manually pushing the carriage 128 backwards until it engages with the electromagnets 124, the carriage (and exciter magnets 122) may be reset into the active position.

In the system described herein, there are 12 reset and braking sub-systems that mounted to the front flange 12 of the casing, however the number can be scaled up or down, in the same way as the number of carriages 128, by adjusting the number (and size) reset and braking sub-systems in order to fit smaller or larger scale spin rigs 10. An adapter piece may be provided, which fits to the carriage 128 to alter the radial position of the exciter magnets 122. This may increase or decrease the radial distance between an exciter magnet and a test piece magnet. The use of adapter pieces may mean that different engine orders and test piece diameters can be tested with minimal alteration to the system.

Figure 7:
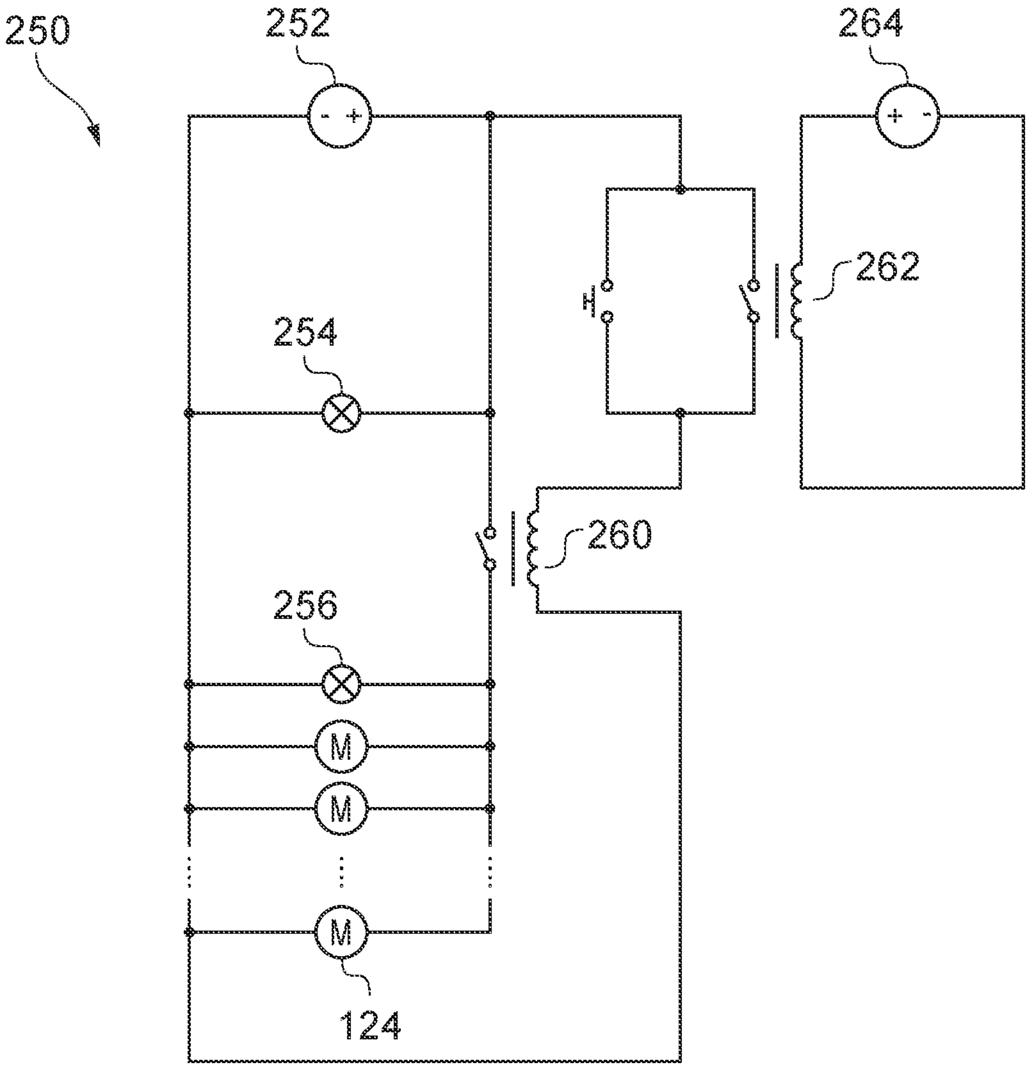
FIG. 7 is a circuit diagram of a control system.

A control system circuit 250 for controlling the release of the electromagnets 124 is shown in a circuit diagram in FIG. 7. In the circuit, there is a 24V DC supply 252, a power-on indicator 254, a timer relay 260, a solid-state relay 262 and a controller 264. The electromagnets are indicated at 124. As described above, the control system 250 features "energise-to-release" electromagnets 124 so that when the circuit is closed, the electromagnets 124 are energised, and the carriage 138 is released. Upon resetting the system 100 by manually pushing the carriages 138 back into the active position, the control system circuit 250 is opened again, and the carriages 128 are therefore held in place by the electromagnets 124.

Figure 8:
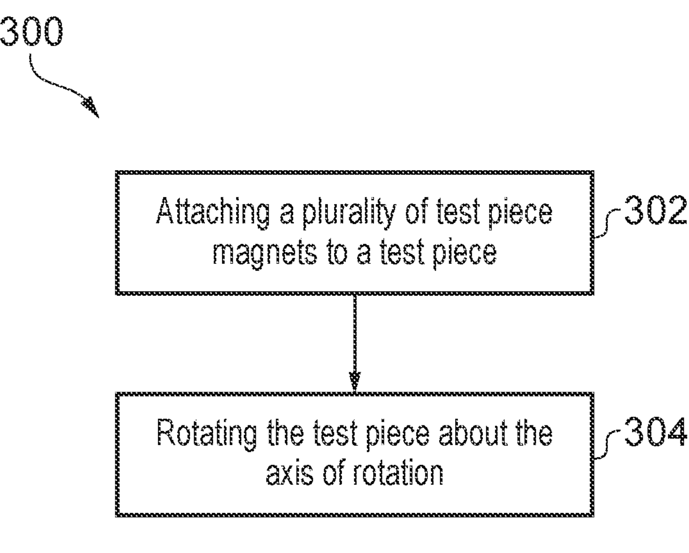
FIG. 8 shows a schematic method.
Figure 9:
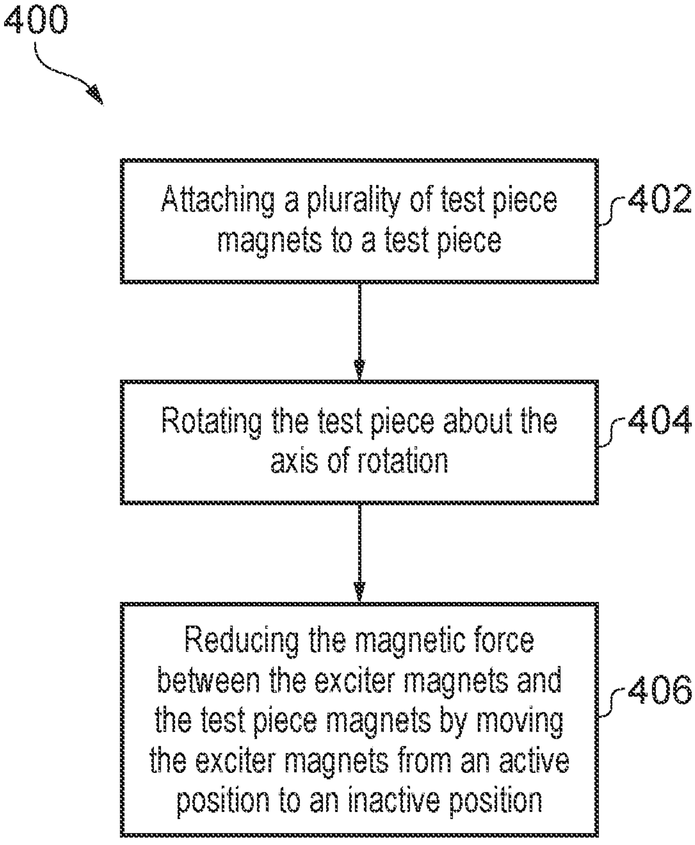
FIG. 9 shows a schematic method.

Methods for test procedures using the excitation system 100 as described above are shown in FIGS. 8 and 9. In FIG. 8, the method of testing a test piece 200 using the non-contact excitation system 100 comprises attaching (step 302) the plurality of test piece magnets 180 to the test piece 200; and rotating (step 304) the test piece 200 about the axis of rotation X. In FIG. 9, the method of testing a test piece 200 using the non-contact excitation system 100 comprises attaching (step 402) the plurality of test piece magnets 180 to the test piece 200; rotating 404 the test piece 200 about the axis of rotation X; and reducing (step 406) the magnetic force between the exciter magnets 122 and the test piece magnets 180 by moving the exciter magnets 122 from the active position to the inactive position.

By rotating the test piece in the spin rig 10 with the excitation system 100, an engine order excitation of the test piece 200 may be produced. Once the test piece vibration response has reached a steady state, the excitation force acting on the test piece may then be rapidly removed by moving the exciter magnets 122 from the active position (i.e. close to the test piece 200) to the inactive position (i.e. away from the test piece 200), by briefly sending power to the electromagnets 124. The carriage 128 is released, and the spring 126 pushes it towards the front flange, moving the exciter magnets 122 away from the test piece 200.

Depending on the objective of the specific test and the actual test piece, several vibration measurement systems can be adopted. In this case one or more strain gauges may be attached on the rotating test piece and strain vs time may be continuously recorded. A slip ring or telemetry device may transmit strain data from the strain gauges to a recording device.

Once the excitation force is removed, the measurement will record the reduction of strain with time allowing for an evaluation of the mechanical damping of the specimen. Damping devices, such as friction dampers, may be added to the test piece to provide non-linear damping. Applying and then removing the excitation force may enable measurement of a free vibration decay, which in turn may provide amplitude dependent damping information, which may be used to characterise tested damping devices. Signal conditioning, data acquisition and post-processing hardware and software may be used to obtain the data.

Figure 10:
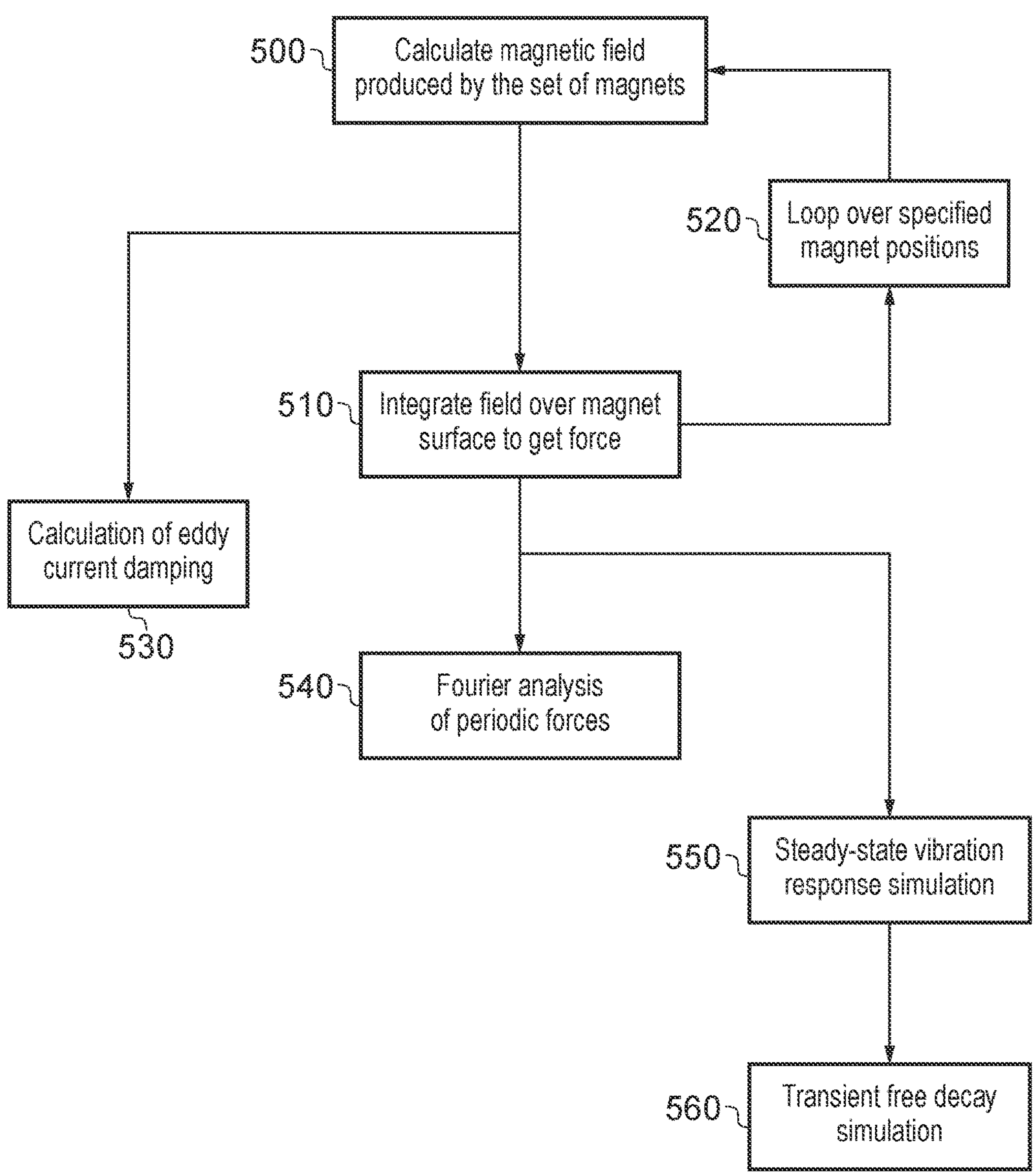
FIG. 10 shows a flow chart for the method of analysis according to the disclosure.

The method of analysing a non-contact excitation system for a spin rig according to the disclosure is illustrated in flow chart form in FIG. 10. For each of the method steps, there is a summary of the inputs to the method of analysis together with a summary of the processing operations that are conducted on the inputs.

In Step 500 the magnetic field is calculated using magpylib. This step involves defining a set of magnets, and calculating the magnetic field B at the points specified in the array grid.

The routine of Step 500 is entirely implemented using the opensource magpylib toolbox in Python® The manner in which variables are defined and this function is called is exactly as the authors of magpylib suggest. The function getB uses analytical/semi-analytical formulae and approximations to calculate the magnetic fields of simple geometries like boxes and cylinders.

| | | Variable | Variable shape | Description |
|---|---|---|---|---|
| Inputs | For each magnet in the problem, define: | Shape | | Choose from 'Box' or 'Cylinder' |
| | | Dimensions | (3,) or (2,) | (x, y, z) dimensions for Box; (radius, thickness) for cylinder |
| | | Magnetization | (3,) | Vector defining magnitude and direction of magnetisation |
| | | Position | (3,) | (x, y, z) co-ordinates of magnet centre |
| | | Rotation | (2,) | Vector containing axis and angle to rotate magnet around |
| | Also define: | Grid | (n, 3) | Vector of (x, y, z) co-ordinates of the n points at which to calculate the magnetic field |
| | | Collection | | Collection of all the magnets to include in the field computation |

-continued

| | Steps | Function call | Output variable shape | Description |
|---|---|---|---|---|
| Processing | 1. Use magpylib function getB to calculate the magnetic field at the points specified in grid | B = Collection.getB(grid) | (n, 3) | 3D magnetic field vector describing the magnitude and direction of the field at each co-ordinate specified in grid variable |

In Step 510 the method of analysis integrates the magnetic field B over the magnet surface to obtain the force.

The routine of Step 510 is implemented in Python®, and builds on the routine of Step 500 to formulate the Maxwell stress tensor and integrate over the surface. The functions getSurface and ForceCalc are written by the inventors, while the function getB is a magpylib function.

Method inputs for Step 510 are described in the following table.

| | | Variable | Variable shape | Description |
|---|---|---|---|---|
| Inputs | For each magnet s in the problem, define: | Shape | | Choose from 'Box' or 'Cylinder' |
| | | Dimensions | (3,) or (2,) | (x, y, z) dimensions for Box; (radius, thickness) for cylinder |
| | | Magnetization | (3,) | Vector defining magnitude and direction of magnetisation |
| | | Position | (3, | (x, y, z) co-ordinates of magnet centre |
| | | Rotation | (2,) | Vector containing axis and angle to rotate magnet around |
| | Label: | s1 | | Magnet on which to calculate resultant force acting on it; i.e., blade tip magnet in our problem; the mesh will be defined on this magnet |
| | | s2, s3 . . . sP | (P − 1,) | All other magnets in the problem, where P is the total number; i.e. exciter magnets in our problem |
| | | c | | Collection containing all magnets in the problem |
| | Also define: | mesh_size | (3,) | Vector containing the number of points (nx, ny, nz) (Box) or (nr, nθ, nz) (Cyl) on each dimension to define the mesh |
| | | delta | (1,) | Parameter to define an offset between the mesh and the physical surface of the magnet; this avoids numerical instabilities and does not introduce any error |

Processing parameters for Step 510 are described in the following table.

| | Steps | Function call | Output variable shape | Description |
|---|---|---|---|---|
| Processing | 1. Define a mesh (almost) on the surface of s1 using function getSurface | [S, N, A] = getSurface(mesh_ size, s1, delta) | S, N, A are lists whose lengths are equal to the number of faces of s1 (i.e., 6 for a Box). Each element of the list is an array with dimensions: | The output mesh is split into each face of the magnet s1. The function uses the dimensions and position properties of s1, as well as delta, to locate the mesh. |

-continued

| Steps | Function call | Output variable shape | Description |
|---|---|---|---|
| | | S: (nf, 3)<br>N: (nf, 3)<br>A: (nf, 1)<br>where nf is the number of grid points on each face | For each face, the mesh is characterised by three variables:<br>S: an array containing the 3D co-ordinate vectors of each point in the mesh<br>N: an array containing vectors describing the direction perpendicular to the magnet surface at each point in S<br>A: an array containing the areas of the each cell in the mesh; the centre of each cell is located by S |
| 2. Use magpylib function getB to calculate the magnetic field (resulting from all magnets in c) at the points specified in the mesh | B = c.getB(S) | [(nf, 3), (nf, 3), . . .] | For each face on the magnet s1, calculate the 3D magnetic field vector at each point in the mesh |
| 3. Calculate the force acting on s1 by forming the Maxwell stress tensor and integrating over the mesh | F = ForceCalc(c, S, N, A) | (3,) | Force vector (Fx, Fy, Fz) with the forces acting on s1 in each axis. Intermediate steps are:<br>(i) Formul ate the Maxwell stress tensor T at each point in the mesh; this is a function only of B<br>(ii) Using N calculate the component of T that is perpendicular to the mesh surface<br>(iii) Use A to integrate over surface area |

In Step 520 the method of analysis integrates the magnetic field B over the magnet surface to obtain the force.

The routine of Step 520 is implemented in Python®, and builds on the routine of Step 500 to formulate the Maxwell stress tensor and integrate over the surface. The functions getSurface and ForceCalc are written by the inventors, while the function getB is a magpylib function.

| | | Variable | Variable shape | Description |
|---|---|---|---|---|
| Inputs | For each magnet s in the problem, define: | Shape | | Choose from 'Box' or 'Cylinder' |
| | | Dimensions | (3,) or (2,) | (x, y, z) dimensions for Box; (radius, thickness) for cylinder |
| | | Magnetization | (3,) | Vector defining magnitude and direction of magnetisation |
| | | Position | (3,) | (x, y, z) co-ordinates of magnet centre |
| | | Rotation | (2,) | Vector containing axis and angle to rotate magnet around |
| | Label: | s1 | | Magnet on which to calculate resultant force acting on it; i.e., blade tip magnet in our problem; the mesh will be defined on this magnet |
| | | s2, s3 . . . sP | (P − 1,) | All other magnets in the problem, where P is the total number; i.e. exciter magnets in our problem |
| | | c1 | | Collection containing all magnets in the problem |
| | | c2 | | Collection containing all magnets except s1 |

-continued

| | Variable | Variable shape | Description |
|---|---|---|---|
| Also define: | mesh_size | (3,) | Vector containing the number of points (nx, ny, nz) (Box) or (nr, nθ, nz) (Cyl) on each dimension to define the mesh |
| | delta | (1,) | Parameter to define an offset between the mesh and the physical surface of the magnet; this avoids numerical instabilities and does not introduce any error |
| | displace | (3,) | Vector defining the displacement trajectory for the magnets. The elements of the vector are (axis along which to displace, distance to displace, number of steps) |

Processing parameters for Step 520 are described in the following table.

| | Steps | Function call | Output variable shape | Description |
|---|---|---|---|---|
| Processing | 1. Define a mesh (almost) on the surface of s1 using function getSurface | [S, N, A] = getSurface(mesh_size, s1, delta) | See 1.2 | See 1.2 |
| | 2. Loop over the number of steps defined in displace | [F, daxis] = DispForceCalc(s1, c2, c1, S, N, A, displace) | F: (number of steps, 3) daxis: (number of steps) | Return a displacement axis daxis and corresponding force in each axis (Fx, Fy, Fz) at each point along daxis |
| | 2(i). Translate magnets in c2 one step along axis and re-generate c1 (collection of all magnets) | c2.move(dx, dy, dz) | | Input distance to move collection c2 along the x, y, z axes. s1 remains stationary and all other magnets move relative to it; this means no changes need to be made to the mesh. The collection containing all the magnets (c1) is redefined after every displacement step |
| | 2(ii) Calculate the magnetic field at S for the new collection of magnets c1 | c1.getB | | See 1.2 |
| | 2(iii) Calculate the force acting on magnet s1 at each step along displacement axis | F = ForceCalc(c, S, N, A) | (3,) | See 1.2 |

In Step 530 the method calculates an estimate for the eddy current damping for a simple analytical case with a single magnet, in which blade vibration is approximated by a continuous beam model. A formula for estimating the damping added by the magnet to a vibration mode was derived and this is integrated numerically in this module.

| | | Variable | Variable shape | Description |
|---|---|---|---|---|
| Inputs | For a single magnet, define: | Shape | | Choose from 'Box' or 'Cylinder' |
| | | Dimensions | (3,) or (2,) | (x,y,z) dimensions for Box; (radius, thickness) for cylinder |

-continued

| | | | | |
|---|---|---|---|---|
| | | Magnetization | (3,) | Vector defining magnitude and direction of magnetisation |
| | | Position | (3,) | (x,y,z) co-ordinates of magnet centre |
| | | Rotation | (2,) | Vector containing axis and angle to rotate magnet around |
| | Define properties of a continuous beam (to approximate the blade of a blisk): | Length, width, thickness, density, Young's modulus, electrical conductivity | | These properties are used to: calculate the natural frequencies of the beam; scale the modeshapes so that they are mass-normalised |
| | | Boundary conditions | | The boundary conditions enable calculation of the beam's vibration modeshapes, which are mass-normalised using the density and geometry of the beam. |
| | Also define: | grid | (n, 3) | Grid of co-ordinate points that cover the beam (located relative to the magnet) |

| | Steps | Function call | Output variable shape | Description |
|---|---|---|---|---|
| Processing | 1. Use magpylib function getB to calculate the magnetic field at the points specified in grid | B = Collection.getB(grid) | (n, 3) | 3D magnetic field vector describing the magnitude and direction of the field at each co-ordinate specified in grid variable |
| | 2. Numerical integration over the beam volume to estimate the damping added to a given mode by eddy currents induced by the magnet | Use equation derived by the inventors: $\zeta_{m,r} = \frac{\sigma dt \int_{L-d}^{L} \phi_r^2(x) \int_0^w B_z^2(z) dz dx}{2\omega_r}$ | | This equation makes some assumptions to simplify the integration, which would otherwise be over 3 axes<br>Only the field component in one axis (z in the equation) is considered<br>The field component is assumed to be constant in two axes, so only varies in one axis (x in the equation)<br>This enables the major contribution to eddy current damping to be estimated (for the simple analytical case); but the other components are ignored |

In Step 540 the method calculates how the geometries of the blade tip magnet and exciter magnets influence the frequency domain characteristics of the periodic force for different engine order cases (i.e., number of exciter magnets spaced evenly around the circumference of the array).

| | | Variable | Variable shape | Description |
|---|---|---|---|---|
| Inputs | For each magnet s in the problem, define: | Shape | | Choose from 'Box' or 'Cylinder' |
| | | Dimensions | (3,) or (2,) | (x, y, z) dimensions for Box; (radius, thickness) for cylinder |
| | | Magnetization | (3,) | Vector defining magnitude and direction of magnetisation |

-continued

| | Variable | Variable shape | Description |
|---|---|---|---|
| | Position | (3,) | (x, y, z) co-ordinates of magnet centre |
| | Rotation | (2,) | Vector containing axis and angle to rotate magnet around |
| Label: | s1 | | Magnet on which to calculate resultant force acting on it; i.e., blade tip magnet in our problem; the mesh will be defined on this magnet |
| | s2 | | Exciter magnet |
| | c | | Collection containing both magnets in the problem |
| Also define: | mesh_size | (3,) | Vector containing the number of points (nx, ny, nz) (Box) or (nr, nθ, nz) (Cyl) on each dimension to define the mesh |
| | delta | (1,) | Parameter to define an offset between the mesh and the physical surface of the magnet; this avoids numerical instabilities and does not introduce any error |
| | displace | (3,) | Vector defining the displacement trajectory for the magnets. The elements of the vector are (axis along which to displace, distance to displace, number of steps) |
| | engine_orders<br>array_radius | (K,)<br>(1,) | Parameters are needed to define the geometries of the periodic arrays that will be assessed; in this case, engine_orders is a vector of length K containing the range of engine orders (i.e., number of exciter magnets around a circumference) that will be used in the parameter study. Array_radius then defines the radius of the circular array. The geometry of the array could be specified in other ways (e.g., with a vector of distances between exciter magnets). |

The routine of Step 540 exploits the fact that magnetic fields and forces can be linearly superimposed. The force is calculated as a single exciter magnet moves past the blade tip magnet. Then for each engine order of interest, the force is superimposed/interpolated to a get a new periodic force; this is much faster than directly calculating the forces in Python®.

Processing parameters for Step 540 are described in the following table.

| | Steps | Function call | Output variable shape | Description |
|---|---|---|---|---|
| Processing | 1. Calculate force as exciter magnet s2 is translated past the blade tip magnet s1 using steps 1.1-1.3 | See 1.1-1.3 | F: (number of steps, 3)<br>daxis: (number of steps,) | The force is calculated as a single exciter magnet is translated past a blade tip magnet. The force (in x, y, z axes) at each displacement step (stored in daxis) is then saved and output from Python$^{RTM}$, so that the rest of the analysis is carried out in Matlab$^{RTM}$. |
| | 2. Loop over the engine orders in engine_order | For k in K: | | |
| | 2(i). For each engine order, calculate a tangential distance between adjacent exciter magnets | delta_x = (2*pi*array_radius)/k<br>daxis_periodic = 0:delta_x | delta_x: (1,)<br>daxis_periodic: (number of steps,) | Calculate the tangential distance between adjacent exciter magnets for an engine order of k. Then define a new displacement axis over this distance daxis_periodic. |

-continued

| Steps | Function call | Output variable shape | Description |
|---|---|---|---|
| 2(ii) Use an interpolation to obtain a force profile as if | F_periodic = PeriodicForce(delta_x, F, daxis) | F_periodic: (number of steps, 3) | Using interp1 (a function provided by Matlab$^{RTM}$ for a 1D interpolation) superimpose the forces from the exciter magnets on to daxis_periodic to obtain a periodic force profile (F_periodic) for engine order k |
| 2(iii) Fast Fourier Transform of the periodic force | F_omega = fft(F_periodic) | (number of steps, 3) | Use Matlab$^{RTM}$ fft function to calculate fourier transform of the periodic force. This enables evaluation of the frequency domain characteristics achieved by the magnet configurations specified at the beginning: in particular, the force at the fundamental excitation frequency and the influence of higher harmonics (in our case, by calculating the Total Harmonic Distortion) |

It is to be noted that there is no particular advantage to carrying out the analysis of Step 540 in Matlab®. It could equally be done in Python® which would remove the need to save and export files.

In Step 550 the method of analysis simulates the vibration of a blade (as a 1-dof oscillator with realistic properties) to see how movement of the blade (and the blade magnet) affects the force produced by the magnet array.

| | | Variable | Variable shape | Description |
|---|---|---|---|---|
| | Generate a periodic magnetic array using the Step 540 (Fourier analysis of periodic forces); this will be used to generate force fields | | | |
| Inputs | Define a 1 dof oscillator to simulate the vibration of the blade | $\omega_n$ Natural frequency $\xi_n$ Damping ratio $\phi_n$ Modeshape | | Choose modal properties to be similar to what is expected in the blisk tests |
| | Also define: | T | (1,) | Simulation time (s) |
| | | dt | (1,) | Time step (s) |

The Simulink® environment in Matlab® has been used because it handles interpolated inputs very efficiently. The oscillator (blade) vibration displacement has both axial and tangential components. When generating the force profiles in Python®, a rotation can be applied to the blade magnet depending on the stagger angle of the blade of the blisk/test piece.

Processing parameters for Step 550 are described in the following table.

| | Steps | Function call | Output variable shape | Description |
|---|---|---|---|---|
| Processing | 1. Generate and axial (y) force profiles | Use steps in 2: Fourier analysis of periodic forces | Fx(x, y): (number of x steps, number of y steps) Fy(x, y): (number of x steps, number of y steps) | Generate axial and tangential forces as functions of axial and tangential positions x and y Here, number of steps refers to the number of displacement steps in the Python$^{RTM}$ computations |
| | 2. Form transfer function representation for 1 dof oscillator | 'Transfer fcn' block in Matlab$^{RTM}$ Simulink$^{RTM}$ environment | T_{uF} | Use standard block from Simulink$^{RTM}$ library |
| | 3. Generate additional input variables needed for time domain simulation | | Fx_rep(x, y); Fy_rep(x, y): (number of time_steps, 1) | Repeat the force matrices along the x (tangential) axis to generate long input vectors |
| | | | Vel (1,) | Define a 'velocity' vel; this is the constant speed at which the blade will translate past the array; it is chosen to ensure that the fundamental forcing frequency matches the resonant frequency of the oscillator |

-continued

| Steps | Function call | Output variable shape | Description |
|---|---|---|---|
| 4. Time series simulation in Matlab$^{RTM}$ Simulink$^{RTM}$ environment | Ode3 - Matlab$^{RTM}$ proprietary fixed-step integration | taxis (number of time steps, 1) daxis (number of time steps, 1) u: (number of time steps,1) Fx, Fy: coupled input forces resiling from the interpolation (number of steps,1) | Define time axis taxis = (0:dt:T) Define displacement axis daxis = vel*taxis Integration of the transfer function using Matlab$^{RTM}$ ode3 function. At each time step t: Calculate tangential position x from vel and t Interpolate Fx__rep and Fy__rep to get input force for the x and y corresponding to t Integrate transfer function to get blade displacement u |
| 5. Analyse u, Fx, Fy using the same techniques as in Step 540 (Fourier analysis of periodic forces). | | | |

In Step 560 the method of analysis generates a force profile that is then used to simulate the response of the blade. After some time, the magnets are moved apart in the axial (y) axis and a free decay is observed and evaluated. The main differences from the steady-state analysis of Step 550 are:

A time point T_trigger is defined; this is some time after the start of the simulation to allow the oscillator to settle into a steady state vibration.

An axial velocity profile is defined, which controls how fast the magnets are moved away.

Until T_trigger, the blade is translated at constant speed along the tangential x-axis, as in the previous analysis.

At T_trigger, the blade is additionally translated in the axial y-axis to simulate the magnetic array being moved away.

While the magnets are moving away, the constant tangential translation is retained, as this simulates rotation of the blisk.

By moving the magnets in the y-axis, the force input to the oscillator is rapidly reduced to 0 so that the oscillator vibration decays.

The vibration decay (as measured by u) is then analysed; the aim of the analysis is to compare damping ratios extracted from the decay with the linear value specified in the description of the 1-dof blade model.

When the blade translates along the x-axis a periodic force is exerted on the blade. It is moved along the y-axis until the force reduces to zero (for this, extra data points in the y axis are needed when compared to the figure below).

It will be understood that the disclosure is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein.

What is claimed is:

1. A method of analysing a non-contact excitation system for a spin rig, the spin rig comprising a plurality of test piece elements for attachment to a test piece for rotation about an axis of rotation (X) of the spin rig, and a plurality of exciter elements arranged around the axis of rotation; the method comprising the steps of:

(i) providing the test piece elements and the exciter elements formed from magnetically attractive material;

(if) providing either or both of the test piece elements and the exciter elements as comprising magnets;

(ii) arranging each exciter element as being moveable between an active position, in which a magnetic force is provided between each exciter element and at least one of the test piece elements, and an inactive position, in which the magnetic force between the exciter elements and the at least one test piece element is reduced;

(iv) calculating a magnetic field per test piece element;

(v) integrating the magnetic field over the test piece element surface to get a force per test piece element;

(vi) repeating step (iv) for different test piece element positions;

(vii) performing a Fourier analysis of the forces acting on the test piece element as it moves past a periodic array of exciter elements;

(viii) calculating a damping added to the test piece element due to magnetic induction;

(ix) calculating a vibration response of the test piece element as it moves past a stationary array of exciter elements;

(x) calculating a transient response of the test piece element where the stationary array of exciter elements is rapidly moved away from the test piece elements; and (xi) using the calculated transient response of the test piece element to calculate a required electromagnetic holding force for the array of exciter elements.

2. The method of analysing a non-contact excitation system for a spin rig according to claim 1, wherein method step (iv) comprises the steps of:

(iv-a) for each magnet define a set of dimensions;

(iv-b) for each magnet define a grid of points, each point having co-ordinates; and (iv-c) calculating a magnetic field at each of the grid points.

3. The method of analysing a non-contact excitation system for a spin rig according to claim 2, wherein method step (v) comprises the steps of:

(v-a) defining a mesh on a surface of the magnet;

(v-b) calculating a magnetic field at points specified in the mesh; and (v-c) calculating a force acting on the magnet by forming a Maxwell stress tensor and integrating over the mesh.

4. The method of analysing a non-contact excitation system for a spin rig according to claim 3, wherein method step (vi) comprises the steps of:

(vi-a) defining a mesh on a surface of the magnet;

(vi-b) defining a trajectory for the magnets;

(vi-C) loop over the number of steps defined by a displacement trajectory;

(vi-d) calculating a magnetic field for a new collection of magnets;

(vi-e) defining a trajectory for the magnets; and (vi-f) calculating a force acting on the magnet at each step along a displacement axis.

5. The method of analysing a non-contact excitation system for a spin rig according to claim 3, wherein method step (vii) comprises the steps of:

(vii-a) calculating a force generated as each exciter magnet translates past a blade tip magnet;

(vii-b) loop over engine orders;

(vii-c) calculating, for each engine order, a tangential distance between adjacent exciter magnets;

(vii-d) calculating a periodic force profile using the forces generated by the magnets; and (vii-e) calculating a Fast Fourier Transform of the periodic force profile.

6. The method of analysing a non-contact excitation system for a spin rig according to claim 3, wherein method step (viii) comprises the steps of:

(viii-a) defining properties of a continuous beam to approximate an engine blade;

(viii-b) defining a grid of coordinate points that cover the continuous beam; and (viii-c) integrating over the beam volume to estimate the damping resulting from eddy currents induced by the magnet.

7. The method of analysing a non-contact excitation system for a spin rig according to claim 3, wherein method step (ix) comprises the steps of:

(ix-a) calculating tangential and axial force profiles for a blade;

(ix-b) create a transfer function representative of a single degree of freedom oscillator;

(ix-c) defining a velocity, a time axis, and a displacement axis for the blade; and (ix-d) performing a transfer function integration to obtain blade displacement.

8. The method of analysing a non-contact excitation system for a spin rig according to claim 3, wherein method step (x) comprises the steps of:

(x-a) generating a force profile to simulate a response of a blade;

(x-b) repeating the force profile generation after a time delay; and (x-c) calculating a free decay for the blade.

* * * * *